Figure 4:
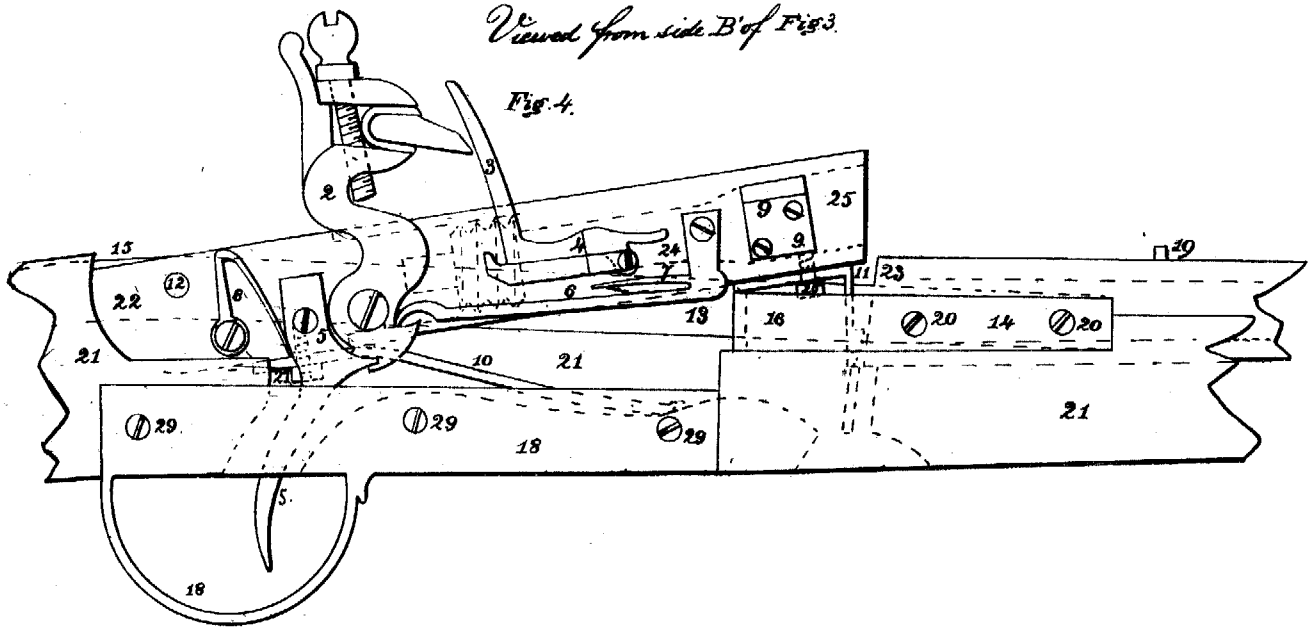

1516X
3 Sheets—Sheet 1.
J. H. HALL.
Breech-Loading Fire-Arm.
Patented May 21, 1811.
Fig. 1. Viewed from side B' of Fig. 3.
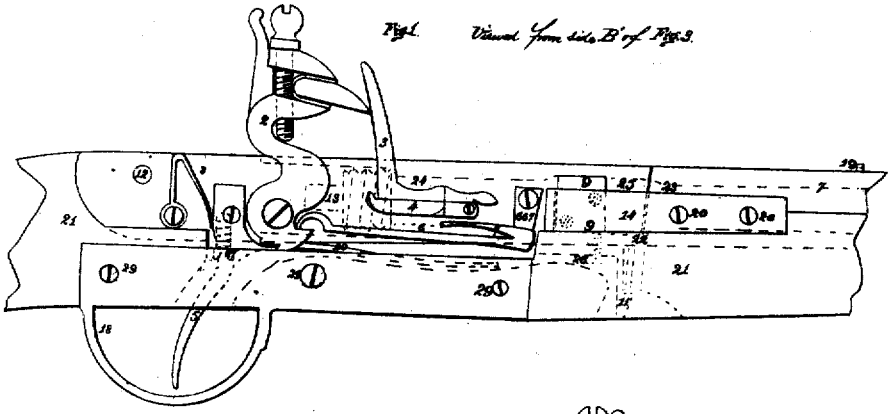
Fig. 2. Viewed from side C' of Fig. 3.
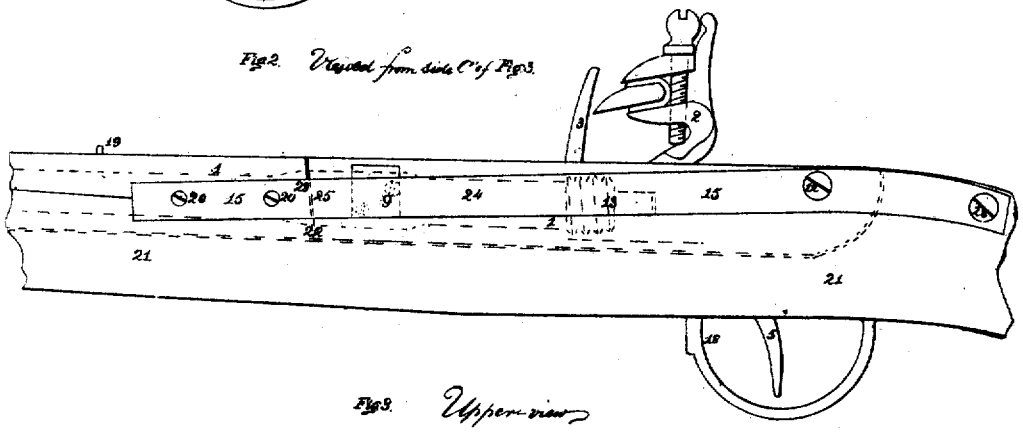
Fig. 3. Upper view.
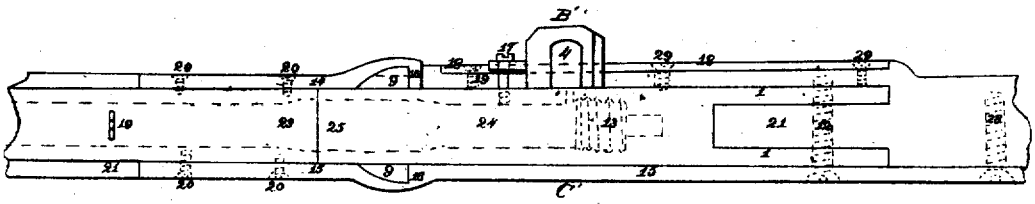

1516X

3 Sheets—Sheet 2.

J. H. HALL.

Breech-Loading Fire-Arm.

Patented May 21, 1811.

View of the piece ready to receive its charge

Viewed from side B of Fig. 3.

1516X
Sheet 3 - 3 Sheets;
J. H. Hall,
Breech-Loading Firearms,
Patented May 21, 1811.
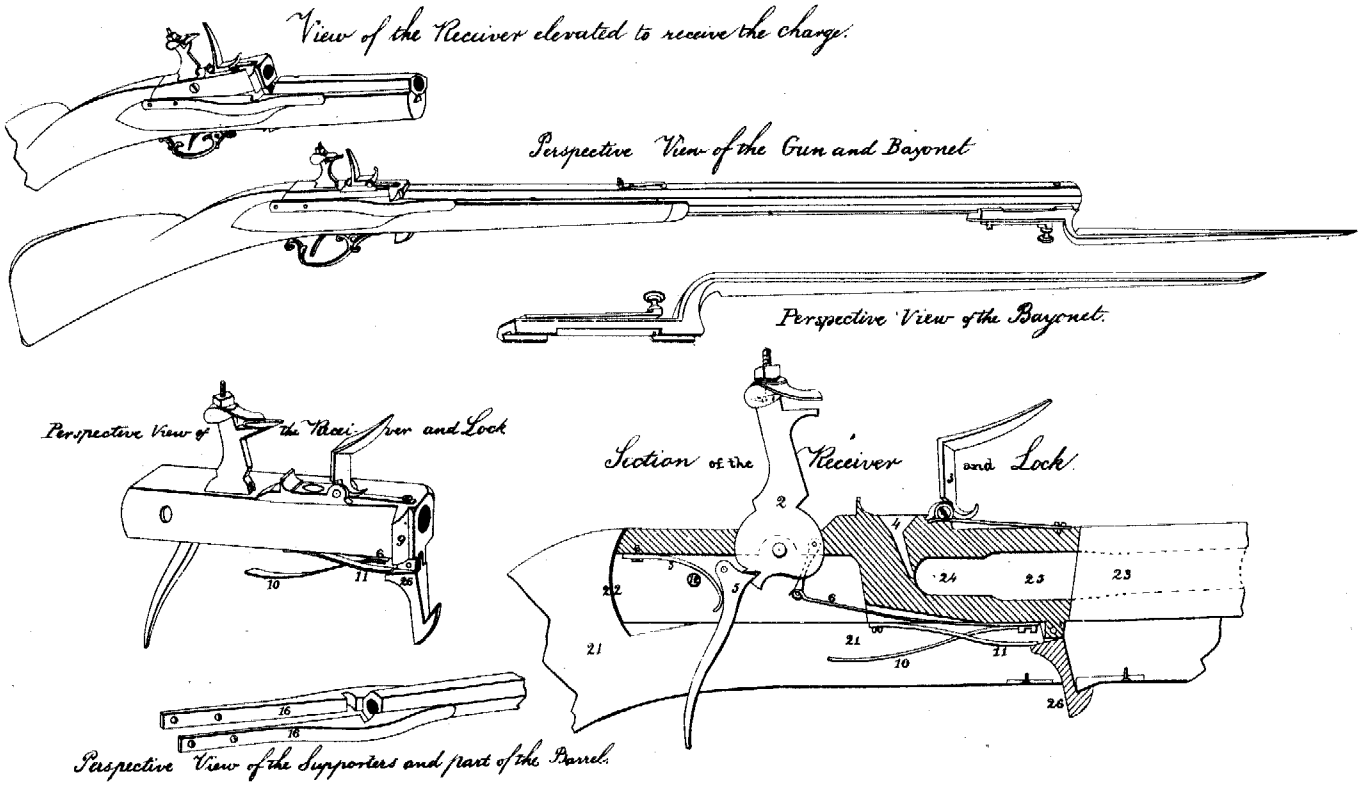

1516X

UNITED STATES PATENT OFFICE.

JOHN H. HALL, OF PORTLAND, MAINE, AND WILLIAM THORNTON, OF WASHINGTON, D. C.

IMPROVEMENT IN FIRE-ARMS.

Specification forming part of Letters Patent dated May 21, 1811.

*To all whom it may concern:*

Be it known that we, JOHN H. HALL, of Portland, Maine, and WM. THORNTON, of Washington, D. C., have invented an Improvement in Fire-Arms, of which the following is a specification.

*A short description of the improvement in fire-arms invented by John H. Hall, of Portland, District of Maine.*

The barrel is in two pieces. That which forms the breech rises at its fore end upon touching a spring, or by any other method which may be found more convenient. The charge is then put into the receiver—viz., the breech part of the gun—without a ramrod, taking care to press the ball or shot to the powder with the finger. By this construction of the gun it may be loaded in less time and with less trouble than is necessary in loading common guns, in every situation, either standing, sitting, or lying. The ball goes with more certainty and force, because the chamber, being made where it receives a ball a little larger than the other part of the bore, admits with ease a ball which completely fills the barrel in front, thus insuring its course in the direction of the bore, and preventing the elastic fluid from escaping by the side of the ball. The frequent cleaning of the barrel inside is avoided, for the ball, going tightly, drives out all before it, and also the danger of bursting, an—accident which frequently happens by putting in two cartridges, for in this gun you can put but one.

The peculiar construction of the lock, its simplicity, and its being attached to the barrel instead of the stock present the advantages of cheapness in construction and of durability. The parts are less in number than the parts of other locks, and consequently the chances of disorder are lessened. That part of the stock which with the locks now used is cut in every direction by the holes for screws, triggers, &c., and thereby much weakened, is left uninjured by this, and as strong as any other part of the stock in proportion to its size.

I refer to the particular description with drawings, given under my hand and seal at Portland, March 16, 1811.

*Description of an improvement in fire-arms.*

The barrel is in two parts, one of which—viz., the fore or longest part—I call the "barrel," and the other—or shortest part—the "receiver." This receiver consists of a chamber or cavity for receiving the charge, and a hinder part for the cock, trigger, and trigger-spring. The chamber must be of such a size as to contain rather more than a charge, so that the one who loads may not be hindered by a cartridge which is accidentally large, or by the foulness which gathers after repeated discharges, lessening the capacity of the chamber.

Chambers for military guns should be all the way of the same size as the bore of the barrel, excepting where the ball goes, and there they should be rather larger, so as to admit with ease a ball which will completely fill the barrel through which it is to be propelled. The receiver is square and hollow behind the breech to the extremity; but two of its sides—viz., the upper and under—are omitted, leaving a vacancy between the right and left sides, which may be occupied by the wood of the gun-stock 21 21. Through the extremities of the right and left sides is a hole for a pin, 12, by which the receiver is connected with the left supporter, 15, on which pin the receiver turns as an axis either when raising or shutting it down. On each side of the receiver, and near its mouth, is a preventer, 9 9, which corresponds exactly to a shoulder in each supporter 16 16, by which the recoil of the receiver from the barrel when the gun is fired is prevented. Each preventer has a head, which, meeting the upper sides of the supporters when shutting the receiver down to the barrel, prevents its descent beyond a certain point. The muzzle of the receiver should either be arched perpendicularly from top to bottom, making a curve whose center is at 12, or be cut slantingly, so that its end may be a tangent to the lower part of the curve at 22.

4 is the pan, fastened to the receiver either by screws or by brazing.

3 is the hammer.

6 7 is the mainspring, which answers also for the hammer-spring fastened to the receiver.

2 is the cock, the bottom of which is in the form of a tumbler, and serves for that purpose.

5 is the trigger and dog, both in one.

8 is the trigger-spring.

11 is the catch-spring, which passes through the stock and catches on a piece of metal fixed in the stock, thus preventing the receiver from rising by the force of the elevator 10.

13 is the breech-pin, with a square head, by which it is turned with a screw-driver.

14 is the right supporter.

15 is the left supporter, by which the receiver is connected with the barrel when elevated.

16 16 are notches, which receive the preventers 9 9 when the receiver shuts down, preventing its recoil from the barrel when discharging.

17 is the screw for hammer.

18 18 represent the guard, which is fastened on the side of the barrel.

19 is one of the sights.

20 20 are screws by which the supporters are fastened to the barrel.

21 21 is the gun-stock.

22 is the joint.

23 is the entrance of the barrel, which is bell-formed at its hinder part, to receive with ease the ball when propelled from the chamber.

24 is the chamber.

25 is the place for the ball.

At 9 9 are screws which fasten the preventers to the receiver. These preventers are let into the receiver a little, to prevent their giving way, which might possibly be the case if they depended wholly upon the screws at 9 9.

26 is the screw for the catch-pin.

27 is the screw for the elevator.

28 is the screw-pin by which the left supporter is connected with the stock.

29 29 are screws by which the guard is fastened to the stock.

Given under my hand and seal at Portland, March 16, 1811.

JOHN H. HALL. [L. S.]

In presence of—

I. G. DANA,

NAT. GIDDING.

---

*Wm. Thornton's rifle or improved gun.*

This invention consists of a receiver, movable by sliding either perpendicularly or laterally or endwise, or else movable on an axis either perpendicularly or laterally, and connected with the barrel by a piece or pieces of metal. The receiver is moved either by means of a spring, lever, or screw, and is kept in its place, when shut down or brought in a line with the barrel, by means of a catch, lever, screw, or bolt. It is applicable to every species of fire-arms.

Its advantages are, dispatch and convenience in loading in every situation, either lying on the ground, sitting, standing, or on horseback.

*More particular description.*

The receiver consists of a cavity or chamber in solid metal; or a chamber of one metal may be let or screwed into another metal. This cavity or chamber for containing the charge may either be conical, cylindrical, or otherwise. The muzzle of the receiver should either be arched perpendicularly from top to bottom, making a curve whose center is the axis on which the receiver moves, or be cut slantingly, so that its upper end may be a tangent to the lower part of the curve. The lock may either be let into the solid metal of the chamber or attached to it, or placed on the side of the piece, as usual, taking care to form the parts correspondently. The chamber, receiver, or cavity, whether containing the lock or not, is connected with the barrel by two pieces of metal, and moves perpendicularly or vertically on an axis, and its recoil from the barrel is prevented by two shoulders near its muzzle, which enter two notches in the side pieces of metal. The rear parts of these shoulders, as also the rear parts of the notches, are formed to a curve described from the axis on which the receiver turns. The rear extremity of the receiver is formed in the same way, that it may make a good joint with the wood-work of the stock. A screw may pass through the rear extremities of the side pieces of metal, serving to connect them with the stock. Under the barrel are loops, as for common guns, by which it is fastened to the stock. Under the fore part of the barrel is a dovetailed rib in military guns, with a hole near each extremity for receiving a pin attached to a spring on a bayonet, by which the bayonet is kept to its place, either when fixed to the end of the barrel or when retracted. The bayonet has instead of a socket a handle, in which is a dovetailed groove corresponding to the rib on the barrel. In case of the gun being whole-stocked, the rib must be shorter, and no provision made for retracting the bayonet.

1 is the chamber of solid metal, or one metal screwed or let into another. This chamber or receiver may be conical, cylindrical, or otherwise, and the muzzle of the receiver may be arched perpendicularly from top to bottom, making a curve whose center is at twelve, or be cut slantingly, so that its end may be a tangent to the lower part of the curve at 22.

2 is the cock, which may be made in any elegant form.

3 is the hammer, the spring of which may be concealed.

4 is the touch-hole. When made at the top, it enters at the center of the chamber. The touch-hole may be made at the side, and the lock be put on the outside of highly-finished pieces.

5 is the trigger and dog, both in one.

6 is the mainspring, which may be made in various ways.

1516X 7 is the mainspring, which answers also for the hammer-spring fastened to the receiver.

8 is the trigger-spring.

9 are preventers, which are solid shoulders, or may be screwed onto the cnamber-piece, and which, by entering into the notches of the side pieces or supporters, 16 16, prevent the recoil from the barrel while discharging, for if the chamber be made very tight it will be difficult to shut it after a few discharges, in consequence of its expansion. This precaution was therefore found necessary, and answers completely.

10 is the elevator or spring which throws up the chamber or receiver.

11 is the catch-spring, which passes through the stock.

12 is the axis or center on which the receiver or chamber moves up and down.

13 is the bottom of the chamber.

14 is the right supporter.

15 is the left supporter, by which the receiver is connected with the barrel when elevated.

16 are the supporters.

17 is the screw for the hammer.

18 is the guard, which is fastened to the barrel.

19 is one of the sights.

20 is the screw by which the supporters are fastened to the barrel.

21 is the gun-stock.

22 is the joint between the chamber and stock.

23 is the entrance of the chamber, which may be bell-formed at its hinder part, to receive with ease the ball or shot when propelled from the chamber. The barrel may be rifled or smooth-bored.

24 is the powder-chamber.

25 is the place for the ball or shot, chargeable either by cartridge or flask.

26 is one species of catch, over which may be a guard. Any other catch, either on the side, or a bolt on the side, or a bolt formed by the trigger-guard, may be substituted.

27 is the screw for the elevator.

28 is the screw-pin by which the left supporter is connected with the stock.

29 are screws by which the ground is fastened to the stock.

WM. THORNTON.

Supt. Patent Office, 1802 & 1828.